United States Patent Office 3,345,325
Patented Oct. 3, 1967

3,345,325
KAOLIN CLAY-LOADED ELASTOMERS
Kenneth Vincent Martin, Wilmington, Del., assignor to E. I. du Pont de Nemours and Company, Wilmington, Del., a corporation of Delaware
No Drawing. Filed Apr. 28, 1964, Ser. No. 363,271
5 Claims. (Cl. 260—41.5)

ABSTRACT OF THE DISCLOSURE

A compound elastomer exhibiting increased cure rate and modulus comprising a kaolin clay-loaded, sulfur-curable, chain-saturated α-olefin hydrocarbon copolymer containing (1) an aromatic compound having at least two hydroxyl, primary amino, and secondary amino groups (e.g., resorcinol or 4,4-methylenedianiline), (2) sulfur, and (3) an organic accelerator (e.g., thiocarbamate, thiazole, or thiuram sulfide type accelerators).

---

This invention relates to new compounded elastomer compositions displaying outstanding curing behavior and their preparation.

Sulfur-curable, mineral-loaded hydrocarbon elastomer stocks have a wide variety of valuable applications such as shoe soles and heels, garden hose, and wire and cable coatings. For some applications where a high modulus stock is required, it is necessary to use reinforcing kaolin clays, the so-called "hard clays." Unfortunately, these stocks are difficult to cure. Unlike black-loaded stocks, they have required an unduly long cure time to attain the desired stress-strain properties. Furthermore, in some cases, e.g., with sulfur-curable α-olefin hydrocarbon copolymers having only a moderate degree of unsaturation, the vulcanizate moduli have not been as high as desired for certain applications.

It has unexpectedly been found that the cure rate and modulus of kaolin clay-loaded sulfur-curable hydrocarbon elastomers can be improved by curing such elastomers in the presence of (1) an aromatic compound having at least two groups attached thereto selected from the group consisting of hydroxyl, primary amino and secondary amino, (2) sulfur and (3) an organic accelerator.

The invention is applicable to a wide variety of "hard" kaolin clay-loaded stocks; in general, they become harder, the 300% moduli are substantially increased, the permanent sets at break are reduced substantially, and the compression set values are lowered; typically, the Mooney scorch time at 250° F. is not adversely affected, in some cases being increased from 2–4 minutes providing more processing safety. When "soft" kaolin clay is substituted and diamine promoters are employed, the degree of improvement does not approach that which was obtained when "hard" clays were used. In most cases moderately improved states of cure were obtained when "hard" clays were used. In more cases only moderately improved states of cure were obtained as judged by the 300% modulus figure and the compression set data.

An important advantage of the present invention is that its beneficial effect is observed in steam cures; stocks containing the additives are 2–3 times as tightly cured as the controls. Prior to this invention, it was not possible to realize the states of cure such as these in steam vulcanizates without heat treatment.

The invention is applicable to a wide variety of sulfur-curable hydrocarbon polymers. A particularly valuable application concerns the sulfur-curable chain-saturated α-olefin hydrocarbon copolymers. These normally solid rubber-like materials are made from at least one α-monoolefin and at least one non-conjugated diene. The α-mono-olefins have the structure R—CH=CH$_2$, where R is H or C$_1$–C$_{16}$ alkyl, and are preferably straight-chained. Representative non-conjugated dienes include: open-chain C$_6$–C$_{22}$ dienes having the structure

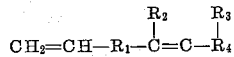

wherein R$_1$ is an alkylene radical, R$_2$, R$_3$, and R$_4$ are independently selected from the group consisting of hydrogen and alkyl radicals; dicyclopentadiene; 5-methylene-2-norbornene; a 5-alkenyl-2-norbornene; a 2-alkyl-2,5-norbornadiene; cyclopentadiene; and 1,5-cyclooctadiene.

Representative procedures for making copolymers are given in U.S. Patents 2,933,480, 3,000,866, 3,063,973, 3,093,620 and 3,093,621. When cyclic non-conjugated dienes are employed, it is preferred that the reaction mixture contain ethylene and at least one other α-monoolefin. An ethylene copolymer should contain about 20 to 75 weight percent ethylene monomer units if it is to be rubber-like.

Another group of polymers which can be employed can be termed "hydrocarbon diene rubbers" and are characterized by having at least 20 mole percent conjugated diene monomer units incorporated in the polymer chains; frequently the diene concentration is over 50 mole percent. Representative examples of these rubbers include: natural rubber; butadiene-styrene rubbers (SBR); isoprene rubber (IR); butadiene rubber (BR); styrene-isoprene rubbers (SIR). The nomenclature employed for describing these rubbers is taken from paragraph 4(a) of ASTM D 1418-58T, tentative recommended practice for nomenclature for synthetic elastomers and latexes. Representative commercially available elastomers of this type and their suppliers are more particularly described in Compounding Ingredients for Rubbers, third edition, Cuneo Press of New England, Cambridge, Mass., compiled by the editors of Rubber World, 630 Third Ave., New York 17, N.Y., pages 555–591, 592, 595–608, 614–627. Diene polymers and copolymers are described also in Synthetic Rubber, G. S. Whitby, Editor-in-chief, John Wiley & Sons, Inc., New York, 1954, chapters 21, 22 and 23. Diene polymers and copolymers are also described in Introduction to Rubber Technology, edited by M. Morton, Reinhold Publishing Corporation, New York, 1959, chapters 3 (Natural Rubber), and 10 (SBR). Further descriptions are contained in Synthetic Rubber Technology, volume I, W. S. Penn, Maclaren and Sons, Ltd., London, 1960, chapter 3 (SBR). Additional information is given in Rubber, Fundamentals of Its Science and Technology, J. Le Bras, Chemical Publishing Company, Inc., New York, 1957, pages 288–289, 292, 294–314. Processes for making diene polymers are described in the patents tabulated in the review book Linear and Stereoregular Addition Polymers, N. G. Gaylord and H. F. Mark, Interscience Publishers, New York, 1959; pages 368–371 (polybutadiene), 372–375 (polyisoprene), 376, 377 (dimethylbutadiene), 382–389 (α-olefin/conjugated diene copolymers), 390–391 (butadiene/isoprene copolymer), 398–399 (polybutadiene), 400–405 (polyisoprene), 406–407 and 454–455.

The preferred diene rubbers include natural rubber, SBR, 1,4-polybutadiene, cis-1,4-polyisoprene. The preferred SBR rubber contains about 54–97 weight percent butadiene monomer units; the particularly preferred SBR incorporates about 23.5 weight percent styrene units, has a Mooney (ML-4/100° C.) viscosity of about 46–54 and has a viscosity-average molecular weight of about 270,000. The particularly preferred polybutadienes have at least about 90% cis-1,4-units. The polyisoprene preferred is largely made up of 1,4-monomer units of which about at least 90% are cis.

Kaolin clay of the type familiar to those skilled in the art as a "hard" clay, that is a clay which will noticeably reinforce the elastomer stock, is preferred for use in the present invention. When promoters of the phenolic type such as resorcinol are employed, "soft" clay loaded stocks are also suitable. The diamine promoters, however, only marginally improve the "soft" stocks. Those skilled in the art readily understand that kaolin clays may have identical crystalline structures yet differ markedly in their ability to reinforce an elastomer stock. This distinction appears to depend upon a dissimilarity in their particle size distribution. The "hard" clays tend to be finer than the "soft" clays. Hard clays have very few particles greater than 5 microns in size (typically about 2.9%) whereas the soft clays much more (typically about 9–20%). A very high proportion (typically 89.9%) of the hard clay particles are smaller than 2 microns; in contrast, only about 60–70% of the soft clay particles are this small. The "hard" clays are often produced by the conventional dry process (air floatation); this process can also yield the "soft" clays. The wet process (classification in a water suspension) often leads to the "soft" clays.

The proportion of clay employed can be selected to suit the needs of the particular application. Typical values range from about 50 to about 250 per 100 parts of elastomer.

The promoter compounds whose employment is the heart of the present invention are aromatic compounds, frequently carbocyclic compounds, having two or more primary or secondary amino or phenolic hydroxyl groups attached to the aromatic ring portion of the molecule. Substituents such as halogen, alkyl and alkoxy can be present on the ring. Aliphatic amino compounds are unsuitable. No improvement at all occurs in the ultimate *state* of cure. Introduction of a small proportion of an aliphatic amine, e.g., less than 2 phr., will generally improve the *rate* of cure in clay stocks by lowering the acidity. If enough amine is added to make the system basic, e.g., more than 2 phr., retardation in the *rate* of cure occurs. In the present invention I have achieved a greatly improved *state* of cure. To say all this in still another way: if no amine is used, a poor vulcanizate is obtained; if an aliphatic amine is added, the same poor vulcanizate is made but some cure time is saved; if the promoter is supplied, an outstanding vulcanizate is produced and quickly, too. Tertiary amines are inoperable. 4,4-methylenedianiline and m-phenylenediamine are preferred promoters. Compounds such as resorcinol and metaaminophenol are examples of the alternatives which have phenolic hydroxyl groups or both amino and hydroxyl groups.

One group of representative compounds correspond to the following structural formula

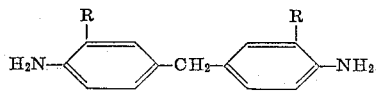

wherein R is selected from the group consisting of H, halogen, alkyl and lower alkoxy. The halogen radicals include chlorine, bromine, fluorine and iodine with chlorine being preferred. The number of carbon atoms present in the alkyl radical is not critical, however, the preferred alkyl radicals contain not more than 8 carbon atoms. Representative arylene diamines are 4,4-methylenedianiline which is preferred; 4,4'-methylenebis(2-chloroaniline); 4,4'-methylenebis(2-bromoaniline); 4,4'-methylenebis(2-iodoaniline); 4,4' - methylenebis(2-fluoroaniline); 4,4'-methylenebis(2-methoxyaniline); 4,4' - methylenebis(2-ethoxy-aniline); 4,4' - methylenebis(2-methylaniline); 4,4'-methylenebis(2-ethylaniline); 4,4' - methylenebis(2-isopropylaniline); 4,4'-methylenebis(2 - n - butylanilline); and 4,4'-methylenebis(2-n-octylaniline).

Other aromatic diamines which may be used include compounds such as:

bis(4-aminophenyl)sulfone;
toluene-2,4-diamine;
1,5-naphthalenediamine;
cumene-2,4-diamine;
4-methoxy-1,3-phenylenediamine;
1,3-phenylenediamine;
4-chloro-1,3-phenylenediamine;
4-bromo-1,3-phenylenediamine;
4-ethoxy-1,3-phenylenediamine;
2,4'-diaminodiphenylether;
5,6-dimethyl-1,3-phenylenediamine;
2,4-dimethyl-1,3-phenylenediamine;
4,4'-diaminodiphenylether;
benzidine;
4,6-dimethyl-1,3-phenylenediamine;
4,4'-methylenedianiline;
9,10-anthracenediamine;
4,4'-diaminodibenzyl;
2,4-diaminostilbene;
1,4-anthradiamine;
2,5-fluorenediamine;
1,8-napthalenediamine;
2,6-diaminobenzfuran;
3,3'-diphenyldiamine;
2-methylbenzidine;
2,2'-dimethylbenzidine;
3,3'-dimethylbenzidine;
2,2'-dichloro-3,3'-dimethylbenzidine;
5,5'-dibromo-3,3'-dimethylbenzidine;
2,2'-dichlorobenzidine;
2,2'-dimethoxybenzidine;
2,2',5,5'-tetramethylbenzidine;
2,2'-dichloro-5,5'-diethoxybenzidine;
2,2'-difluorobenzidine;
3,3'-difluorobenzidine;
3-ethoxybenzidine;
3-ethyl-3'-methylbenzidine;
2,2'-6,6-tetrachlorobenzidine;
2,2',6,6'-tetrafluorobenzidine;
3,3',5,5'-tetraiodobenzidine;
3-trifluoromethylbenzidine; and
2-iodobenzidine.

Another group of amines have two secondary amino groups wherein one valence of each amino nitrogen atom is attached to an aromatic ring and another valence of each amino nitrogen atom is attached to an aliphatic carbon atom (preferbly a lower aliphatic carbon atom). The amino groups may be on the same or on different aromatic rings.

Representative examples of the secondary diamines wherein both amino groups are attached to the same aromatic ring include the following compounds:

N,N'-dimethyl-1,3-toluenediamine;
N,N'-di-sec-butyl-1,3-toluenediamine;
N,N'-di-sec-butyl-1,3-phenylenediamine;
N,N'-di-sec-butyl-1,4-phenylenediamiane;
N,N'-di-n-hexyl-1,4,-phenylenediamine;
N,N'-dibenzyl-1,4-phenylenediamine;
N-isopropyl,N'-isobutyl-1,4-phenylenediamine;
N,N'-diisopropyl-1,4-phenylenediamine;
N-methyl, N'-isobutyl-1,4-phenylenediamine.

Representative examples of secondary diamines wherein the amino groups are situated on different aromatic rings include the following compounds: N,N'-diphenylethylenediamine, which is preferred; N,N'-diphenyl-1,3-diaminopropane; N,N'-diphenyl-2,3-butanediamine; N,N'-di-o-tolylethlenediamine; N,N'-di - o - tolyl - 1,4 - xylyldiamine. Further examples include 4,4'-methylenebis(N-alkyl aniline) compounds such as 4,4'-methylenebis(N-methyl aniline); 4,4'-methylene bis(N-sec-butyl aniline); 4,4' - methylenebis(2 - chloro - N - methyl aniline); 4,4'- methylene bis(2-methyl-N-ethyl aniline); and 4,4'-methylene bis(2-methoxy-N-isopropyl aniline).

The compositions also contain sulfur and a suitable accelerator. The systems familiar to those skilled in the processing of sulfur-curable α-olefin hydrocarbon copolymers, natural rubber, butadiene/styrene rubber, and butyl rubber are examples of suitable systems. It is preferable to use a combination of sulfur, a metal oxide, and a vulcanization accelerator. In general, about 1 to 3 parts of sulfur are used for every 100 parts by weight of the copolymer; larger or smaller concentrations may be used, of course, when deemed desirable. The optimum amount of sulfur needed can readily be determined by those skilled in the art by routine experiments in which vulcanizate properties are studied as a function of increasing concentrations of sulfur. If too little sulfur is employed, for example 1 part per 100 in some cases, the addition of the amine or phenolic hydroxyl compound may lead to retardation of the cure. When more sulfur is employed the vulcanizate properties improve and employment of the optimum concentration will yield the outstanding high modulus products characteristic of the present invention. In some cases the chain-saturated side-chain unsaturated α-olefin hydrocarbon copolymers having about 1 to 10% by weight diene units may require about 1.5 to 4 parts per 100 sulfur.

Frequently zinc oxide is also employed, its concentration ranging from about 3 to 10 parts by weight; cadmium oxide is a less preferred alternative. The most active accelerators include 2-mercaptobenzothiazole, thiuram sulfides, dithiocarbamates and their simple derivatives. Of the three classes, the thiuram sulfides and dithiocarbamates are generally preferred because they produce rapid curing without attendant scorching and develop and maintain maximum physical properties even on extended curing cycles. For many uses, however, 2-mercapto-benzothiazole and its derivatives, alone or in combination with thirurams or dithiocarbamates provide adequate acceleration with processing safety. Representative accelerators include: tetramethyl thiuram monosulfide; tetramethyl thiuram disulfide; tellurium monosulfide; tetramethyl thiuram disulfide; tellurium diethyldithiocarbamate; the zinc salt of dimethyl dithiocarbamic acid; 2-mercaptothiazoline; 2-mercaptothiazole; N,N-diethylthiocarbamyl-2-mercaptobenzothiazole; and 2,2'-dithiobisbenzothiazole.

The proportion of the promoter compound will depend upon the nature of the compound itself, the hydrocarbon elastomer, the clay, and the particular requirements for the vulcanizate. Those skilled in the art can determine by routine experiments the proper concentration of the promoter to achieve the desired vulcanizate properties. Frequently only a very small proportion will be necessary for attaining outstanding results, for example a tenth part to 5 parts per 100 parts of elastomer. A more preferred concentration includes the range 0.5–3 parts. The use of excessively large amounts of promoter may retard the cure in some instances.

In addition to the components already mentioned, the compositions of the present invention can contain other components. Typical examples include antioxidants, pigments and petroleum oils. The optional additives can be introduced at any time prior to beginning the cure.

The compositions of the present invention can be prepared with the aid of any conventional mixing equipment. Thus the elastomer stock can be compounded on a rubber roll mill or in an internal mixer such as a Banbury mixer or a Struthers-Wells mixer. In order to obtain the maximum benefit of adding the aromatic cure promoter to the elastomer stocks, it is necessary to ensure that this adjuvant is well dispersed in the system. It is frequently preferable to prepare the stocks according to the following procedure: the hydrocarbon elastomer is banded on a rubber roll mill; then the clay, optionally the petroleum oil, and the promoter are introduced. Subsequently, the mixture is passed several times through rolls heated to 250° F. The temperature for this treatment is selected, if possible, to melt the promoter and improve its distribution in the stock. If the promoter is not melted, its distribution tends to be heterogeneous; as a consequence the vulcanize quality is not the best which is possible from that composition. The stock is then allowed to cool and the accelerators and sulfur are added. If an internal mixer such as one of the type listed above is employed, it is immaterial when the promoter is introduced. Thus the amines and other additives can be mixed directly into the elastomer and on top of the clay and oil. In every case, identical results are obtained. The heat build-up during a mixing cycle in an internal mixer is sufficient to raise the stock temperature to about 250° F.; accordingly, the additive is melted and dispersed without difficulty.

For operating convenience it is sometimes preferable to employ the promoter in combination with the conventional accelerator. The mixture of the accelerator and the promoter can be prepared by ball milling the components until a uniform powder is obtained. After this material has been sieved through a fine screen, it is stored in the absence of air. Representative mixtures include the following: 6 parts of tetramethylthiuram disulfide, 4 parts of 2,2'-dithiobisbenzothiazole (MBTS) and 4 parts of resorcinol; 6 parts of tetramethylthiuram disulfide, 4 parts of 2,2'-dithiobisbenzothiazole and 4 parts of metaphenylenediamine; 6 parts of tetramethylthiuram disulfide, 2 parts of 2-mercaptobenzothiazole (MBT) and 4 parts of resorcinol; 6 parts of tetramethylthiuram disulfide, 2 parts of 2-mercaptobenzothiazole, and 4 parts of metaphenylenediamine.

The special combinations described above can be introduced at any time into the rubber composition provided that the temperature is high enough to insure melting and uniform dispersion of the promoter component present. Thus when mixing is done on a rubber roll mill, the clay, optionally petroleum oil, and the special combination are added to a band of the hydrocarbon copolymer on the mill. The stock is then passed several times through rolls heated to 250° F. After everything has been uniformly dispersed, the resulting composition is allowed to cool and the remaining accelerators and sulfur are introduced at temperatures in the range of 75–100° F. If an internal mixer, such as a Struthers-Wells mixer, is employed, the internal temperature during the mixing is sufficient to melt the promoter component of the special combination. It is sometimes advantageous to add the special combination after the others have been introduced into the mixer.

The curing procedure employed will be modified by those skilled in the art in accordance with the nature of the stock being cured. Various procedures and modifications of sulfur curing are more particularly described in Encyclopedia of Chemical Technology, Kirk and Othmer, published by Inter-Science Encyclopedia, Inc., New York, 1953, 11, pages 892–927; Principles of High-Polymer Theory and Practice, Schmidt and Marlies, published by McGraw-Hill Book Co., New York, 1948, pages 556–566; Chemistry and Technology of Rubber, Davis and Blake, published by Reinhold Publishing Corp., New York, 1937, chapter 6; Introduction to Rubber Technology, edited by M. Morton, Reinhold Publishing Corp., New York, 1959, pages 93–129; The Applied Science of Rubber, edited by W. J. S. Naunton, Edward Arnold, Ltd., London, 1961, pages 346–413, 992–1099.

Vulcanization is accomplished by heating the compounded stock at a temperature ranging from about 130–180° C. for a period of time ranging from about 2 to 30 minutes. Temperatures between about 150 and 170° C. are particularly preferred. The time and temperature preferred will depend somewhat on the nature of the stock and the ultimate properties required. Those skilled in the art can determine the best time and temperature by empirical experiments. The state of cure is best determined by the value of the modulus at 300% extension at 25° C.

and the compression set at elevated temperature (e.g., 70–100° C.).

ETHYLENE/PROPLYENE/1,4-HEXADIENE COPOLYMER (EPH)

This copolymer was prepared in tetrachloroethylene in the presence of a diisobutyl aluminum chloride/vanadium oxytrichloride catalyst according to the general procedures set forth in U.S. Patent 2,933,480. It exhibited a Mooney viscosity (ML-4/250° F.) of about 70. It contained the following monomer unit composition by weight: ethylene, 52%; propylene, 44%; 1,4-hexadiene, 4%.

"HARD" KAOLIN CLAY

The clay ["Suprex" Clay, available from J. M. Huber Corp., N.Y.] was an air-floated "hard" kaolin type containing 44–46% silica, 37.5–39.5% alumina, 1.5–2% iron oxide and 1–2% titanium dioxide by weight, the ignition loss being 13.9–14.2% by weight. The moisture content (maximum) was 1.0% by weight. The pH (in water) was 4.5–5.5. This clay has a specific gravity of 2.60, a 325-mesh screen residue of 0.17% by weight, and the following particle size distribution (by weight): >10$\mu$, 0.1%; 5–10$\mu$, 2.8%; 4–5$\mu$, 1.5%; 3–4$\mu$, 2.3%; 2–3$\mu$, 3.4%; 1–2$\mu$, 9.0%; 0.5–1$\mu$, 19.0%; 0–0.5$\mu$, 61.9%.

ETHYLENE/PROPYLENE/DICYCLOPENTADIENE COPOLYMER (EPD)

This copolymer exhibits a Mooney viscosity (ML-4/202° F.) of about 120–150. It contains the following monomer unit composition by weight: ethylene, 43–54%; propylene, 42–52%; dicyclopentadiene, 4–5%. It is prepared in accordance with U.S. Patent 3,000,866.

ETHYLENE/PROPYLENE/5-METHYLENE-2-NORBORNENE COPOLYMER (EPN)

This copolymer exhibits a Mooney viscosity (ML-4/212° F.) of about 90–100. It contains the following monomer unit composition by weight: ethylene, 51.5–56.5%; propylene, 40–44%; 5 - methylene - 2 - norbornene, 3.5–4.5%. It is prepared in accordance with U.S. Patent 3,093,621.

The invention will now be described with reference to the following examples of specific embodiments thereof wherein parts and percentages are by weight unless otherwise specified.

Example 1

Two stocks, A and B, were compounded on a rubber roll mill at about 200° F. using the following components in the order shown:

| Order | Component | Parts by Weight |
|---|---|---|
| 1 | Ethylene Copolymer (EPH) | 100 |
| 2 | "Hard" Kaolin Clay | 120 |
| 3 | Naphthenic Petroleum Oil ("Necton 60") | 20 |
| 4 | Zinc Oxide | 5 |
| 5 | Diamine (See Table below) | 2 |

The homogeneous compositions resulting were then further compounded on a cool mill (about 75–100° F.) using the following components and order:

| Order | Component | Parts by Weight |
|---|---|---|
| 6 | Tetramethylthiuram Disulfide | 3 |
| 7 | Sulfur | 2.5 |
| 8 | 2-Mercaptobenzothiazole | 1 |

For purpose of comparison a control stock C outside the scope of the present invention was made the same way as A and B except that the diamine was omitted. Each stock was cured for 5, 10, 20, 30 and 40-minute periods in a press at 320° F. The vulcanizates displayed the following properties at 25° C.

TABLE I.—EFFECT ON HARD CLAY LOADED ETHYLENE TERPOLYMER VULCANIZATES

| Stock | A | B | C (Control) |
|---|---|---|---|
| Diamine present | [1] MPD | [2] MDA | None |
| Cured 5 min./320° F.: | | | |
| 100% Modulus (p.s.i.) | 275 | 320 | 120 |
| 300% Modulus (p.s.i.) | 660 | 750 | 320 |
| Tensile strength (p.s.i.) | 2,200 | 2,200 | 2,000 |
| Extension at break (percent) | 660 | 870 | 930 |
| Cured 10 min./320° F.: | | | |
| 100% Modulus (p.s.i.) | 350 | 400 | 170 |
| 300% Modulus (p.s.i.) | 950 | 840 | 400 |
| Tensile strength (p.s.i.) | 2,200 | 2,200 | 2,100 |
| Extension at break (percent) | 700 | 690 | 790 |
| Cured 20 min./320° F.: | | | |
| 100% Modulus (p.s.i.) | 450 | 520 | 270 |
| 300% Modulus (p.s.i.) | 1,250 | 1,100 | 520 |
| Tensile strength (p.s.i.) | 2,000 | 1,900 | 2,300 |
| Extension at break (percent) | 500 | 550 | 700 |
| Cured 30 min./320° F.: | | | |
| 100% Modulus (p.s.i.) | 460 | 600 | 280 |
| 300% Modulus (p.s.i.) | 1,300 | 1,200 | 560 |
| Tensile strength (p.s.i.) | 1,900 | 1,900 | 2,200 |
| Extension at break (percent) | 500 | 500 | 660 |
| Cured 40 min./320° F.: | | | |
| 100% Modulus (p.s.i.) | 550 | | 280 |
| 300% Modulus (p.s.i.) | 1,400 | | 600 |
| Tensile strength (p.s.i.) | 1,900 | | 2,000 |
| Extension at break (percent) | 460 | | 640 |
| Compression set: | | | |
| 22 hr./70° C. (percent) | 18.7 | 19.5 | 39.3 |
| 22 hr./100° C. (percent) | 43.4 | 44.5 | 76.5 |
| Mooney Scorch: | | | |
| Min. to 10 Pt. Rise at 250° F. | 9 | 9 | 9 |
| Minimum value (points) | 47 | 47 | 48 |

[1] m-Phenylenediamine.
[2] 4,4'-methylenedianiline.

Example 2

The effect of adding m-phenylenediamine to ethylene copolymer stocks D, E, G and H having various concentrations of clay and oil was studied. For purpose of comparison, control stocks A, C, and F outside the scope of the present invention were made the same way as D, E, G and H except that the diamine was omitted. The general procedure of Example 1 was followed. Table II below gives the vulcanizate data obtained at 25° C.

TABLE II.—EFFECT ON ETHYLENE TERPOLYMER VULCANIZATES AT DIFFERENT CLAY/OIL LEVELS

| | A | B | C | D | E | F | G | H |
|---|---|---|---|---|---|---|---|---|
| Hard Kaolin Clay | 60 | 60 | 100 | 100 | 100 | 200 | 200 | 200 |
| Naphthenic Petroleum Oil | 10 | 10 | 50 | 50 | 50 | 100 | 100 | 100 |
| m-Phenylenediamine | | ([1]) | | 2 | 3 | | 2 | 3 |
| Cured 10 min./320° F.: | | | | | | | | |
| 300% Modulus (p.s.i.) | 320 | 560 | 250 | 350 | 330 | 150 | 300 | 240 |
| Tensile strength (p.s.i.) | 2,200 | 1,700 | 1,600 | 1,600 | 1,500 | 700 | 1,000 | 700 |
| Elongation at break (percent) | 700 | 660 | 890 | 940 | 1,040 | 1,150+ | 1,090 | 1,220 |
| Cured 30 min./320° F.: | | | | | | | | |
| 300% Modulus (p.s.i.) | 480 | 840 | 350 | 615 | 510 | 230 | 475 | 400 |
| Tensile strength (p.s.i.) | 1,000 | 1,250 | 1,850 | 1,600 | 1,800 | 1,150 | 1,100 | 1,000 |
| Elingation at break (percent) | 510 | 440 | 740 | 710 | 860 | 1,000 | 840 | 940 |
| Mooney Scorch: | | | | | | | | |
| Min. to 10 Pt. Rise | 12 | 11 | 17 | 22 | 30 | 21 | 36 | 35 |
| Minimum Value (points) | 38 | 40 | 22 | 22 | 20 | 19 | 18 | 17 |

[1] 2 MDA.

Example 3

Two stocks, A and B were compounded on a rubber roll mill according to the procedure given for Example 1 except that SBR 1500 was substituted for the ethylene copolymer, 0.2 part of tetramethylthiuram monosulfide replaced the 3 parts of tetramethylenethiuram disulfide called for, and only the diamine concentrations indicated in the table below were used.

For purpose of comparison, a control stock C outside the scope of the present invention was made the same way as A–B except that the diamine was omitted. The stocks were then heated at 320° F. for 5, 10, 15, 20, and 30 minutes. Table III below gives the vulcanizate properties at 25° C. of all the stocks cured for 5 minutes and of the best stocks obtained from each composition.

TABLE III.—EFFECT ON HARD CLAY LOADED SBR VULCANIZATES

|  | A | B | C (control) |
| --- | --- | --- | --- |
| m-Phenylenediamine (phr.) | 1 | 2 | 0 |
| 5 min./320° F.: |  |  |  |
| 100% Modulus (p.s.i.) | 275 | 275 | 150 |
| 300% Modulus (p.s.i.) | 600 | 600 | 350 |
| Tensile strength (p.s.i.) | 1,400 | 1,300 | 700 |
| Extension at break (percent) | 800 | 860 | 900 |
| Cure time at 320° F. (30 mins.) | 15 | 15 | 30 |
| 100% Modulus (p.s.i.) | 350 | 350 | 300 |
| 300% Modulus (p.s.i.) | 900 | 800 | 650 |
| Tensile strength (p.s.i.) | 1,900 | 1,800 | 2,000 |
| Extension at break (percent) | 700 | 760 | 800 |

TABLE IV.—EFFECT ON HARD CLAY LOADED BUTYL VULCANIZATES

|  | A | B | C (control) |
| --- | --- | --- | --- |
| m-Phenylenediamine (phr.) | 1 | 2 | 0 |
| 20 min./320° F.: |  |  |  |
| 100% Modulus (p.s.i.) | 250 | 275 | 125 |
| 300% Modulus (p.s.i.) | 650 | 650 | 250 |
| Tensile strength (p.s.i.) | 1,700 | 1,700 | 1,700 |
| Extension at break (percent) | 660 | 540 | 770 |
| Permanent set (percent) | 87 | 59 | 111 |
| 40 min./302° F. |  |  |  |
| 100% Modulus (p.s.i.) | 350 | 325 | 150 |
| 300% Modulus (p.s.i.) | 850 | 800 | 250 |
| Tensile strength (p.s.i.) | 1,600 | 1,400 | 1,700 |
| Extension at break (percent) | 570 | 540 | 690 |
| Permanent set (percent) | 70 | 59 | 106 |

Example 5

Two stocks were compounded on a rubber roll mill according to the general procedure of Example 1 except that the ethylene copolymer was replaced by the following copolymers:

| Component: | Parts by weight |
| --- | --- |
| Copolymer (EPD) | 100 (A–B); 0 (C–D) |
| Copolymer (EPN) | 0 (A–B); 100 (C–D) |

Stocks B and D, which were outside the scope of the present invention because they continued no amine, were included for purposes of comparison.

The vulcanizate properties at 25° C. are shown below.

TABLE V.—EFFECT ON OTHER CLAY LOADED ETHYLENE TERPOLYMER VULCANIZATES

|  | Copolymer (EPD) | | Copolymer (EPN) | |
| --- | --- | --- | --- | --- |
|  | A | B (control) | C | D (control) |
| m-Phenylenediamine | 2 | 0 | 2 | 0 |
| 10 min./320° F.: |  |  |  |  |
| 100% Modulus (p.s.i) | 470 | 300 | 300 | 225 |
| 200% Modulus (p.s.i.) | 1,040 | 600 | 600 | 420 |
| Tensile strength (p.s.i.) | 1,200 | 1,150 | 1,450 | 1,600 |
| Extension at break (percent) | 240 | 440 | 560 | 720 |
| Permanent set (percent) | 8 | 43 | 51 | 100 |
| Shore A hardners | 63 | 63 | 67 | 62 |
| 30 min./320° F.: |  |  |  |  |
| 100% Modulus (p,s.i.) | 750 | 460 | 500 | 325 |
| 200% Modulus (p.s.i.) | 1,620 | 850 | 850 | 560 |
| Tensile strength (p.s.i.) | 2,000 | 2,000 | 1,700 | 2,100 |
| Extension at break (percent | 240 | 400 | 440 | 600 |
| Permanent set (percent) | 10 | 45 | 31 | 77 |
| Shore A hardness | 69 | 67 | 72 | 65 |

Example 4

Two stocks, A and B, were compounded on a rubber roll mill according to the procedure for Example 1 except that 100 parts of butyl rubber (type 218) was substituted for the ethylene copolymer, the tetramethylthiuram disulfide concentration was lowered to 2.5 parts, and only the diamine concentrations indicated below were used. For purposes of comparison a control stock C outside the scope of the present invention was made the same way as A and B except that the diamine was omitted.

The stocks obtained were cured for 20 and 40 minute-periods at 320° F. Table IV which follows gives the properties of the vulcanizates at 25° C.

Example 6

Three stocks, A, B, and C, were compounded on a rubber roll mill at about 140° F. using the following components and order:

| Order | Component | Parts by Weight |
| --- | --- | --- |
| 1 | Ethylene Copolymer (EPH) | 100 |
| 2 | "Hard" Kaolin Clay | 120 |
| 3 | Naphthenic Petroleum Oil | 20 |
| 4 | Zinc Oxide | 5 |
| 5 | Cure Promoter (See Table VI) | 5 |

The mill temperature was then raised to 250° F. and the promoter was homogeneously dispersed. Finally, the mill was cooled to about 100–140° F. and the following components were added:

| Component: | Parts by weight |
|---|---|
| Tetramethylthiuram disulfide | 3 |
| Sulfur | 2.5 |
| 2-mercaptobenzothiazole | 1 |

For purpose of comparison a control stock D (outside the scope of the present invention) was made the same way except that no promoter was added. All stocks were then cured for 30, 60 and 120-second periods using 225 p.s.i. steam. The vulcanizate properties at 25° C. were as follows:

TABLE VI.—EFFECT ON STEAM CURING OF ETHYLENE TERPOLYMER CLAY STOCKS

|  | A<br>2 phr.<br>MPD [1] | B<br>2 phr.<br>MDA [2] | C<br>2 phr.<br>Resorcinol | D<br>Control |
|---|---|---|---|---|
| Cure 30 sec./225 p.s.i. steam: |  |  |  |  |
| 300% Modulus | 500 | 420 | 650 | 240 |
| Tensile strength | 1,950 | 1,950 | 1,800 | 1,400 |
| Extension at break | 1,000 | 930 | 760 | 1,100 |
| Cure 60 sec./225 p.s.i. steam: |  |  |  |  |
| 300% Modulus | 620 | 550 | 840 | 270 |
| Tensile strength | 2,200 | 2,100 | 2,100 | 1,700 |
| Extension at break | 860 | 820 | 720 | 900 |
| Cure 120 sec./225 p.s.i. steam: |  |  |  |  |
| 300% Modulus | 750 | 700 | 880 |  |
| Tensile strength | 2,100 | 2,100 | 2,100 |  |
| Elongation at break | 780 | 760 | 700 |  |

[1] m-Phenylenediamine.
[2] 4,4'-Methylenedianiline.

In each case the clay and oil were introduced into a band of the hydrocarbon elastomer on a rubber roll mill. After the special combination had been added, the mixture was passed through 250° F. rolls until the resorcinol or the methylenedianiline had melted and become uniformly dispersed; then the stock was cooled to about 75–100° F. and compounded with sulfur and zinc oxide.

All the stocks were cured at 320° F. for 30 minutes. The vulcanizate properties at 25° C. are shown in the following Table VII:

TABLE VII.—USE OF "COMBINATION ACCELERATORS" IN HARD CLAY LOADED ETHYLENE TERPOLYMER STOCKS

|  | A | B | C | D |
|---|---|---|---|---|
| Special Combination (phr.) | 7 | 7 | 6 | 6 |
| Cure 30 min./320° F.: |  |  |  |  |
| 100% Modulus (p.s.i.) | 400 | 460 | 430 | 470 |
| 300% Modulus (p.s.i.) | 1,220 | 1,200 | 1,500 | 1,750 |
| Tensile Strength (p.s.i.) | 2,000 | 1,900 | 2,200 | 2,300 |
| Elongation at Break (percent) | 580 | 500 | 500 | 410 |

*Example 8*

A. Four stocks A–D were compounded according to the general procedure of Part A of Example 1 above except that the mill roll temperature was 250° F. during the dispersion of the amine (or resorcinol). For purposes of comparison, control stocks E and F outside the scope of the present invention were made the same way except that monoamines were employed. For further comparison, control stock G outside the scope of the present invention was made similarly except that no amine was employed. Table VIII which follows gives the vulcanizate data for 10 and 30-minute cures at 320° F.

TABLE VIII.—COMPARATIVE EFFECTIVENESS OF VARIOUS CURE PROMOTERS IN HARD CLAY LOADED ETHYLENE COPOLYMER STOCKS

| Stock | Additive | $M_{100}/M_{300}$ (p.s.i.)<br>[10'/320° F.] | $M_{100}/M_{300}$ (p.s.i.)<br>[30'/320° F.] |
|---|---|---|---|
| A | p-Phenylenediamine | 410/920 | 600/1,320 |
| B | 4,4'-methylenedianiline | 400/840 | 600/1,200 |
| C | 4,4'-methylenebis(N-methylaniline) | 400/840 | 600/1,120 |
| D | Resorcinol | 480/1,320 | 680/1,800 |
| E (control) | Aniline [1] | 400/680 | 520/920 |
| F (control) | N,N-dimethyl-p-phenylenediamine | 320/560 | 400/680 |
| G (control) | None | 120/320 | 280/580 |

[1] The compression set (22 hr./100° C.; Method B) value for the vulcanizate was much higher than that of the vulcanizates made with the amine of A–C, 89 vs. 40–50.

*Example 7*

A. Four special combinations A–D, respectively, were made by ball milling the following components:

| Component | A | B | C | D |
|---|---|---|---|---|
| Tetramethylthiuram disulfide | 60 | 60 | 60 | 60 |
| 2,2'-Dithiobisbenzothiazole | 40 | 40 | 0 | 0 |
| 2-Mercaptobenzothiazole | 0 | 0 | 20 | 20 |
| Resorcinol | 40 | 0 | 40 | 0 |
| Methylenedianiline | 0 | 40 | 0 | 40 |

The uniform powders were sieved through a 80–100-mesh screen and stored in air-tight jars.

B. Four stocks A–D containing the respective special combination were prepared on a rubber roll mill according to the following recipe:

| Component: | Parts by weight |
|---|---|
| Ethylene copolymer (EPH) | 100 |
| "Hard" kaolin clay | 100 |
| Naphthenic petroleum oil | 20 |
| Special combination | (See table below) |
| Sulfur | 2.5 |
| Zinc oxide | 5 |

B. When the procedure of Part A is repeated except that the diamines called for in Stocks A–C are replaced by any of the following compounds, essentially the same results are obtained:

2,4-toluenediamine
2,6-toluenediamine
1,5-naphthalenediamine
o-Phenylenediamine
p-Phenylenediamine
m-Aminophenol

*Example 9*

A soft kaolin clay loaded stock (A) is prepared in accordance with the general procedure of Example 1. Iceberg clay is substituted for the "hard" kaolin clay; resorcinol (2 phr.) is employed as the promoter. For purposes of comparison a control stock (B) outside the scope of the present invention is made the same way except that no promoter is present. Both stocks are then cured for 20 minutes at 320° F. Table IX gives the vulcanizate data obtained at 25° C.

TABLE IX.—EFFECT ON SOFT CLAY LOADED ETHYLENE TERPOLYMER VULCANIZATES

| Promoter | Stock A Resorcinol | Stock B (Control) None |
|---|---|---|
| Vulcanizate Property: | | |
| 100% Modulus (p.s.i.) | 450 | 350 |
| 300% Modulus (p.s.i.) | 1,090 | 630 |
| Tensile Strength (p.s.i.) | 1,150 | 800 |
| Extension at Break | 360 | 440 |
| Permanent Set (percent) | 6 | 16 |
| Shore A Hardness | 66 | 66 |

The compositions of the present invention display improved curing characteristics and yield vulcanizates with better properties than those of the control. Details are set forth in the examples given above. Example 1 shows the results with an ethylene/propylene/1,4-hexadiene composition having 20 parts per 100 of petroleum oil and 120 parts per 100 of hard clay. The stock containing 2 parts per 100 of metaphenylenediamine is cured after 40 minutes at 320° F. to an ultimate 300% modulus which is about 130% greater than that of the control which has no diamine. The stock appears to be as tightly cured after 5 minutes at 320° F. as the control stock after 40 minutes at 320° F. Furthermore, the improved stock exhibits a much lower compression set value in the 22-hour test at 120° C., is harder, and exhibits a much lower permanent set at break than does the control. It is particularly noteworthy that the amine-containing stock exhibits approximately the same processing safey as the control in spite of its faster cure behavior; thus the Mooney scorch time is not greatly changed. Example 2 shows that the improvement provided by the present invention is observed for stocks containing a variety of clay and oil concentrations. Once again the amine-containing stocks exhibit approximately double the 300% moduli of the controls, the permanent sets at break are lower, and the hardness values are higher. The effect is not limited to the sulfur-curable α-olefin copolymers but is also observed in the important hydrocarbon polymers such as styrene/butadiene copolymers (SBR), and butyl rubber. Examples 3 and 4, respectively, illustrate these effects.

As many widely different embodiments of this invention may be made without departing from the spirit and scope thereof, it is to be understood that this invention is no limited to the specific embodiments thereof as defined in the appended claims, and all changes which come within the meaning and range of equivalence are intended to be embraced therein.

What is claimed is:

1. A compounded elastomer exhibiting increased cure rate and modulus comprising a kaolin clay-loaded sulfur-curable, chain saturated, hydrocarbon copolymer of at least one mono-olefin and at least one non-conjugated diene containing (1) an aromatic compound selected from the group consisting of 4,4-methylenedianiline, resorcinol, m-amino-phenol, orthometa- and para-phenylenediamine, 2,4- and 2,6-toluenediamine, and 4,4'-methylene-bis (N-methylaniline), (2) sulfur, and (3) an organic accelerator.

2. A compounded elastomer as defined in claim 1 wherein said organic accelerator is of the thiocarbamate, or thiuram sulfide type.

3. A compounded elastomer as defined in claim 1 wherein said copolymer is a copolymer of ethylene, propylene and a non-conjugated diene.

4. A compounded elastomer as defined in claim 2 wherein said aromatic compound is resorcinol.

5. A compounded elastomer as defined in claim 2 wherein said aromatic compound is 4,4'-methylenedianiline.

References Cited

UNITED STATES PATENTS 3,253,056   5/1966   Coffield et al.   260—807

OTHER REFERENCES

"Kaolin Clays and Their Industrial Uses," J. M. Huber Corporation, 1949, p. 50.

JULIUS FROME, *Primary Examiner.*

S. L. FOX, *Assistant Examiner.*

UNITED STATES PATENT OFFICE
CERTIFICATE OF CORRECTION

Patent No. 3,345,325                                    October 3, 1967

Kenneth Vincent Martin

It is hereby certified that error appears in the above numbered patent requiring correction and that the said Letters Patent should read as corrected below.

Column 1, line 12, for "compound" read -- compounded --; column 4, line 41, for "2,2´,6,6-" read -- 2,2´,6,6´- --; column 6, line 6, for "vulcanize" read -- vulcanizate --; column 8, TABLE I, fourth number under heading A, for "660" read -- 860 --; TABLE II, first column, line 11 thereof, for "Elingation" read -- Elongation --; column 10, TABLE IV, first column, line 8 thereof, for "40 min./302° F." read -- 40 min./320° F. --; TABLE V, first column, line 8 thereof, for "Shore A hardners" read -- Shore A hardness --; column 13, TABLE IX, first column, line 5 thereof, after "Extension at break" insert -- (percent) --; column 14, line 6, for "no" read -- not --; line 14, for "mono-olefin" read -- α-mono-olefin --; line 17, for "orthometa-" read -- ortho-meta- --.

Signed and sealed this 19th day of November 1968.

(SEAL)
Attest:

EDWARD M. FLETCHER, JR.                        EDWARD J. BRENNER
Attesting Officer                                  Commissioner of Patents